United States Patent
Honda et al.

(10) Patent No.: US 9,267,817 B2
(45) Date of Patent: Feb. 23, 2016

(54) ROTATION ANGLE DETECTION DEVICE

(71) Applicant: DENSO CORPORATION, Kariya, Aichi-pref. (JP)

(72) Inventors: Hitomi Honda, Kariya (JP); Akitoshi Mizutani, Okazaki (JP); Yoshiyuki Kono, Obu (JP)

(73) Assignee: DENSO CORPORATION, Kariya (JP)

( * ) Notice: Subject to any disclaimer, the term of this patent is extended or adjusted under 35 U.S.C. 154(b) by 93 days.

(21) Appl. No.: 13/966,825

(22) Filed: Aug. 14, 2013

(65) Prior Publication Data

US 2014/0103911 A1    Apr. 17, 2014

(30) Foreign Application Priority Data

Oct. 12, 2012  (JP) .................................. 2012-226853

(51) Int. Cl.
*G01B 7/30* (2006.01)
*G01D 5/14* (2006.01)

(52) U.S. Cl.
CPC . *G01D 5/14* (2013.01); *G01D 5/145* (2013.01)

(58) Field of Classification Search
CPC ............. G01F 5/14; G01F 5/415; G01B 7/30; G01D 3/02; G01D 5/12; G01D 5/14; G01D 5/145
USPC ........................................ 324/207.25, 207.2
See application file for complete search history.

(56) References Cited

U.S. PATENT DOCUMENTS

| 6,356,073 | B1 | | 3/2002 | Hamaoka et al. | |
|---|---|---|---|---|---|
| 6,646,435 | B1 | * | 11/2003 | Nakamura et al. | 324/207.25 |
| 2005/0030004 | A1 | * | 2/2005 | Takatsuka et al. | 324/117 H |
| 2006/0119353 | A1 | * | 6/2006 | Nakano et al. | 324/207.25 |
| 2007/0229061 | A1 | * | 10/2007 | Uryu et al. | 324/207.25 |
| 2011/0301913 | A1 | * | 12/2011 | Matsumoto et al. | 702/151 |

FOREIGN PATENT DOCUMENTS

JP    2003-185471    7/2003

OTHER PUBLICATIONS

Office Action (3 pages) dated Aug. 28, 2014, issued in corresponding Japanese Application No. 2012-226853 and English translation (5 pages).
Office Action (2 pages) dated Mar. 31, 2015, issued in corresponding Japanese Application No. 2012-226853 and English translation (3 pages).

* cited by examiner

*Primary Examiner* — Son Le
(74) *Attorney, Agent, or Firm* — Nixon & Vanderhye P.C.

(57) ABSTRACT

A rotation angle detection device has a first yoke, an inside surface of which is formed of a first concave curved surface and a second concave curved surface, and a second yoke, an inside surface of which is formed of a third concave curved surface and a fourth concave curved surface. Each concave curved surface does not extend in a second direction but extends toward a first flat surface or a second flat surface in an inclined manner. The first flat surface and the second flat surface face each other sandwiching a Hall element therebetween and are parallel to each other. The magnetic flux, which leaks from the first yoke into an inside space and reaches the second yoke, flows in the second direction over a wider area around the Hall element.

7 Claims, 7 Drawing Sheets

ROTATION ANGLE DETECTION DEVICE

CROSS REFERENCE TO RELATED APPLICATION

This application is based on and incorporates herein by reference Japanese patent application No. 2012-226853 filed on Oct. 12, 2012.

FIELD

The present disclosure relates to a rotation angle detection device.

BACKGROUND

A conventional rotation angle detection device is formed of a first magnet spaced apart from a rotation axis of a rotary body, a second magnet positioned oppositely to the first magnet relative to the rotation axis, a first yoke connecting N-poles of the first magnet and the second magnet, a second yoke connecting S-poles of the first magnet and the second magnet, and a magnetism detection element positioned on the rotation axis. For example, the first yoke and the second yoke are fixed to the rotary body, while the magnetism detection element is fixed to a support body. The rotation angle detection device detects a rotation angle of the rotary body based on an output of the magnetism detection element, which varies with a rotation of the rotary body relative to the support body.

A rotation angle detection device disclosed in JP-A-2003-185471 has two stator core pieces, which sandwich a magnetism detection element, to linearize magnetic flux passing near the magnetism detection element. According to this rotation angle detection device, the magnetic flux passing near the magnetism detection element bends when the stator core pieces are removed. When the magnetic flux passing near the magnetism detection element bend, a detection result changes in response to a positional deviation between the rotary body and the support body even in a case that the rotation angle of the rotary body is the same.

SUMMARY

It is an object to provide a rotation angle detection device, which has less degradation in detection accuracy relative to a positional deviation between a rotary body and a support body.

A rotation angle detection device is provided for detecting a rotation angle of a rotary body, which rotates about a rotation axis center thereof, relative to a support body. In the rotation angle detection device, a first magnet is spaced apart from the rotation axis center of the rotary body and magnetized in a direction tangential to an imaginary circle, which is coaxial with the rotation axis center. A second magnet is positioned oppositely to the first magnet relative to the rotation axis center and magnetized in a same direction as the first magnet. A first yoke is fixed to the rotary body and connects a N-pole of the first magnet and a N-pole of the second magnet. A second yoke is fixed to the rotary body to oppose the first yoke relative to the rotation axis center and connects a S-pole of the first magnet and a S-pole of the second magnet. A magnetism detection element is positioned on the rotation axis center and fixed to the support body. The magnetism detection element outputting an electric signal varying with a change in a magnetic field generated by relative rotation between the rotary body and the support body.

The first magnet and the second magnet are positioned to face each other in a first direction through the rotation axis center. The first yoke and the second yoke are positioned to face each other in a second direction, which is orthogonal to the first direction.

The first yoke has an inside surface, which faces the second yoke and has a first concave curved surface, a second concave curved surface and a first connecting surface. The first concave curved surface extends from the N-pole of the first magnet in a direction different from the second direction such that the first concave curved surface is more spaced apart from the second yoke as more approaching from the first magnet toward the second magnet. The second concave curved surface extends from the N-pole of the second magnet in a direction different from the second direction such that the second concave curved surface is more spaced apart from the second yoke as more approaching from the second magnet toward the first magnet. The first connecting surface connects the first concave curved surface and the second concave curved surface and has a flat surface extending in the first direction or a convex curved surface protruding toward the rotation axis center.

The second yoke has an inside surface, which faces the first yoke and has a third concave curved surface, a fourth concave curved surface and a second connecting surface. The third concave curved surface extends from the S-pole of the first magnet in a direction different from the second direction such that the third concave curved surface is more spaced apart from the first yoke as more approaching from the first magnet toward the second magnet. The fourth concave curved surface extends from the S-pole of the second magnet in a direction different from the second direction such that the fourth concave curved surface is more spaced apart from the first yoke as more approaching from the second magnet toward the first magnet. The second connecting surface connects the third concave curved surface and the fourth concave curved surface and has a flat surface extending in the first direction or a convex curved surface protruding toward the rotation axis center.

EMBODIMENT

A rotation angle detection device will be described in detail with reference to plural embodiments shown in the accompanying drawings. Substantially the same configurations are designated by the same reference numeral throughout the embodiments.

First Embodiment

Figure 1:
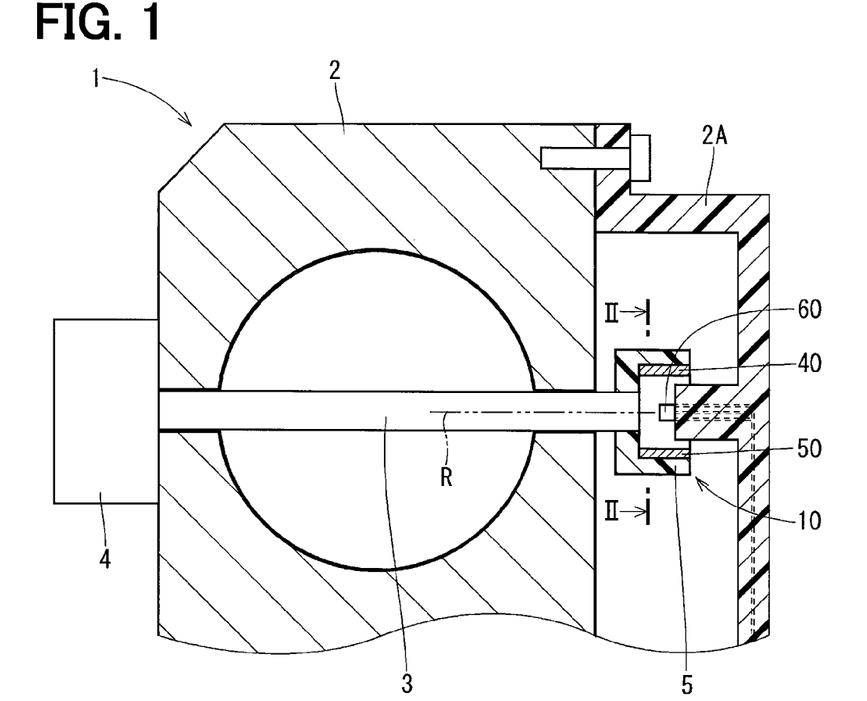
FIG. 1 is a schematic sectional view of an electronic throttle, which incorporates a rotation angle detection device according to a first embodiment.

A rotation angle detection device 1 is implemented, for example, in an electronic throttle system for a vehicle as shown in FIG. 1. The electronic throttle system is formed of a housing 2, a rotary shaft 3 rotatably supported by the housing 2, a rotary actuator 4 capable of rotationally driving the rotary shaft 3, and a rotation angle detection device 10. The housing 2 is a support body for the rotary shaft 3, which is a rotary body. The rotation angle detection device 10 detects a rotation angle (rotational angular position) of the rotary shaft 3 relative to the housing 2. An electric signal representing the detected rotation angle is inputted to an ECU (not shown), which is provided externally. The ECU feedback-controls the rotary actuator 4 in response to the electric signal inputted from the rotation angle detection device 10.

The general configuration of the rotation angle detection device 10 will be described first with reference to FIG. 1 to FIG. 3. The rotation angle detection device 10 is formed of a first magnet 20, a second magnet 30, a first yoke 40, a second yoke 50 and a Hall IC 60 including a Hall element 61. The Hall element 61 is a magnetism detection element.

The first magnet 20 is spaced apart from a rotation axis center R, about which the rotary shaft 3 rotates, in a radial direction of the rotary shaft 3 and magnetized in a direction tangential to an imaginary circle, which is coaxial with the rotation axis center R. The second magnet 30 is positioned oppositely to the first magnet 20 relative to the rotation axis center R. The direction, in which the first magnet 20 and the second magnet 30 are positioned to face each other, is referred to as a first direction D1. The direction, which is orthogonal to the rotation axis center R and the first direction D1 is referred to as a second direction D2. The first magnet 20 and the second magnet 30 are magnetized in a direction parallel to the second direction D2.

The first yoke 40 is made of magnetic material and connects the N-pole of the first magnet 20 and the N-pole of the second magnet 30. The second yoke 50 is made of magnetic material, positioned at an opposite side to the first yoke 40 relative to the rotation axis center R in a manner to face each other in the second direction D2, The second yoke 50 connects the S-pole of the first magnet 20 and the S-pole of the second magnet 30. As shown in FIG. 1, a gear 5 is fixed to an axial end part of the rotary shaft 3. The first yoke 40 and the second yoke 50 are fixed to a radially inside surface of the gear 5. The first yoke 40, the second yoke 50, the first magnet 20 and the second magnet 30 forms a tubular shape, which surrounds the rotation axis center R, and rotates about the rotation axis center R together with the gear 5 when the rotary shaft 3 rotates.

The Hall IC 60 is fixed to a support body 2A at a position, which coincides with the rotation axis center R in an inside space 55 between the first yoke 40 and the second yoke 50. The support body 2A is fixed to the housing 2. As shown in FIG. 3, the Hall IC 60 includes a Hall element 61, an amplifier circuit 62, an A/D converter circuit 63, a signal processing circuit 64, a D/A converter circuit 65 and the like. The Hall element 61 is a magneto-electric conversion element, which uses a Hall effect and outputs an analog signal corresponding to a magnetic flux density in its magnetism sensing surface. The magnetism sensing surface is orthogonal to the first direction D1 in a state shown in FIG. 2, in which the rotary shaft 3 is assumed to be at a reference angular position. The amplifier circuit 62 amplifies the analog electric signal outputted from the Hall element 61. The A/D converter circuit 63 converts the analog electric signal amplified by the amplifier circuit 62 to a digital electric signal. The signal processing circuit 64 performs various signal processing on the digital electric signal outputted from the A/D converter circuit 63. The signal processing circuit 64 is formed of, for example, a DSP (digital signal processor) and includes an offset correction circuit 66, an amplitude correction circuit 67, a linearity correction circuit 68 and the like. The linearity correction circuit 68 corresponds to a linearity correction part, which performs corrections to the output signal of the Hall element 61 in a manner to linearize the output signal of the Hall element 61 to vary proportionally relative to the rotation angle of the rotary shaft 3. The D/A converter circuit 65 converts the digital electric signal outputted from the signal processing circuit 64 to an analog electric signal. The Hall IC 60 outputs the electric signal, which varies with changes in the magnetic field generated by the relative rotation between the rotary shaft 3 and the housing 2.

The rotation angle detection device 10 will be described next with reference to FIG. 4. The inside surface of the first yoke 40 facing the second yoke 50 is formed of a first concave curved surface 41, a second concave curved surface 42 and a first flat surface 43, which is contiguous with the two concave surfaces 41 and 42. The first concave curved surface 41 does not extend in parallel with the second direction D2 but extends from the N-pole of the first magnet 20 in a manner to be distanced away more from the second yoke 50 as it approaches from the first magnet 20 to the second magnet 30. The second concave curved surface 42 does not extend in parallel with the second direction D2 but extends from the N-pole of the second magnet 30 in a manner to be distanced away more from the second yoke 50 as it approaches from the second magnet 30 to the first magnet 20. The first flat surface 43 extends in parallel with the first direction D1 and connects the first concave curved surface 41 and the second concave curved surface 42. The first flat surface 43 corresponds to a first connecting surface. The outside surface shape of the first yoke 40 is the same as its inside surface shape.

The inside surface of the second yoke 50 facing the first yoke 40 is formed of a third concave curved surface 51, a fourth concave curved surface 52 and a second flat surface 53. The third concave curved surface 51 does not extend in parallel with the second direction D2 but extends from the S-pole of the first magnet 20 in a manner to be distanced away more from the first yoke 40 as it approaches from the first magnet 20 to the second magnet 30. The fourth concave curved surface 52 does not extend in parallel with the second direction D2 but extends from the S-pole of the second magnet 30 in a manner to be distanced away more from the first yoke 40 as it approaches from the second magnet 30 to the first magnet 20. The second flat surface 53 extends in parallel with the first direction D1 and connects the third concave curved surface 51 and the fourth concave curved surface 52. The second flat surface 53 corresponds to a second connecting surface. The outside surface shape of the second yoke 50 is the same as its inside surface shape.

Figure 2:
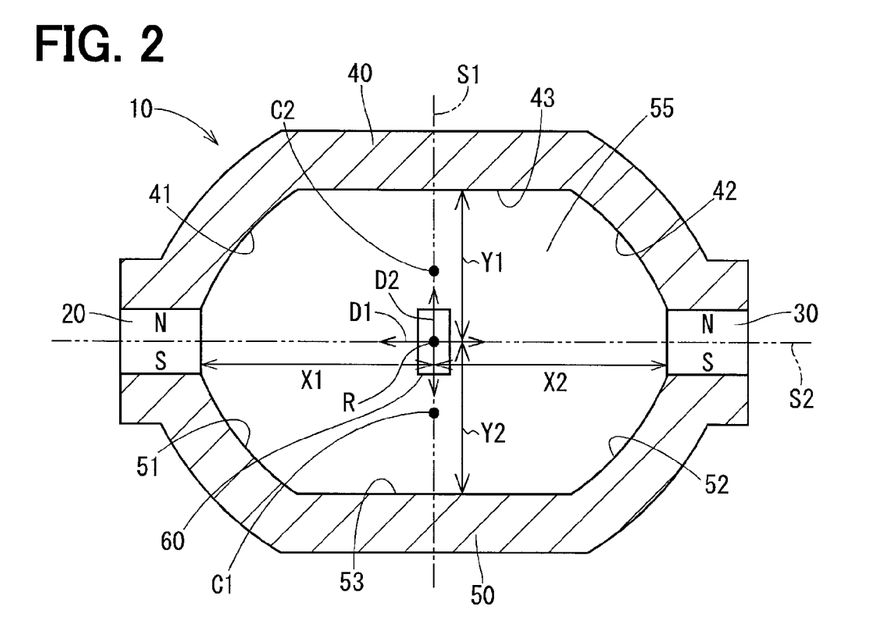
FIG. 2 is a schematic sectional view of the rotation angle detection device taken along a line II-II in FIG. 1.
Figure 3:
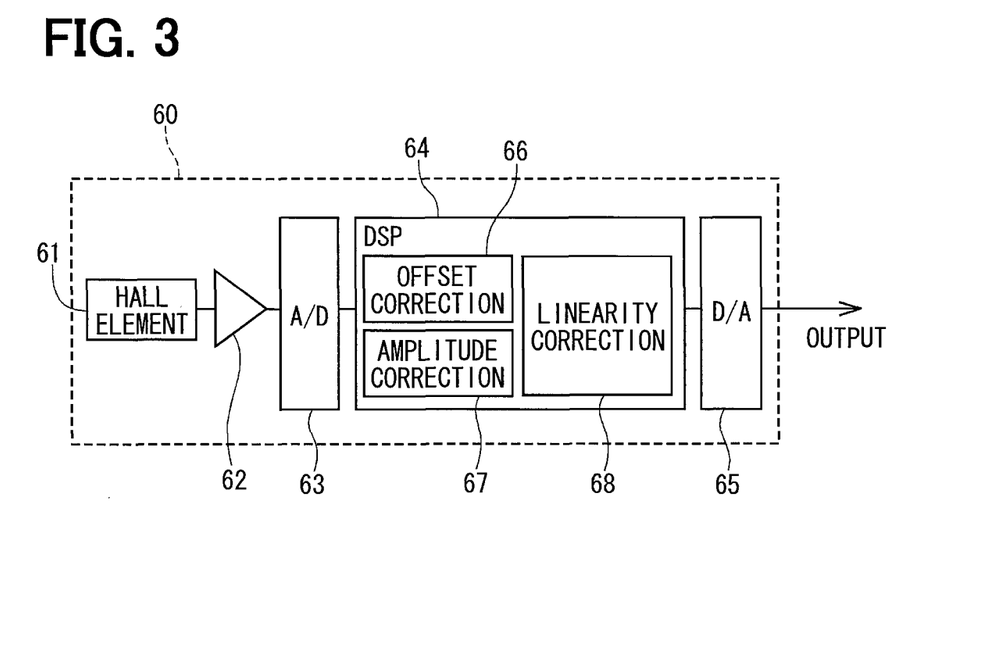
FIG. 3 is a circuit block diagram of a Hall IC shown in FIG. 2.

As shown in FIG. 2, the center C1 of a radius of curvature of the first concave curved surface 41 is coincident with that of the second concave curved surface 42 and positioned at the second yoke 50 side. That is, the center C1 is deviated in the second direction D2 from the rotation axis center R toward the second yoke 50. The center C2 of a radius of curvature of the third concave curved surface 51 is coincident with that of the fourth concave curved surface 52 and positioned at the first yoke 40 side. That is, the center C2 is deviated in the second direction D2 from the rotation axis center R toward the first yoke 40. The first magnet 20 and the second magnet 30 are spaced apart and positioned so that a distance X1 between the first magnet 20 and the rotation axis center R and a distance X2 between the second magnet 30 and the rotation axis center R are equal to each other (X1=X2) in the first direction D1. The first yoke 40 and the second yoke 50 are spaced part and positioned so that a distance Y1 between the first flat surface 43 and the rotation axis center R and a distance Y2 between the second flat surface 53 and the rotation axis center R are equal to each other (Y1=Y2) in the second direction D2. The distance Y1, Y2 is shorter than the distance X1, X2. A tubular body, which is formed of the first yoke 40, the second yoke 50, the first magnet 20 and the second magnet 30, is in a flat plane-symmetric shape relative to a first imaginary flat surface S1 as a first border, which passes the rotation axis center R and extends in the second direction D2. The tubular body is also in a flat plane-symmetric shape to a second imaginary flat surface S2 as a second border, which passes the rotation axis center R and extends in the first direction D1. Thus, the tubular body is generally in an elliptic shape in cross-section.

Figure 4:
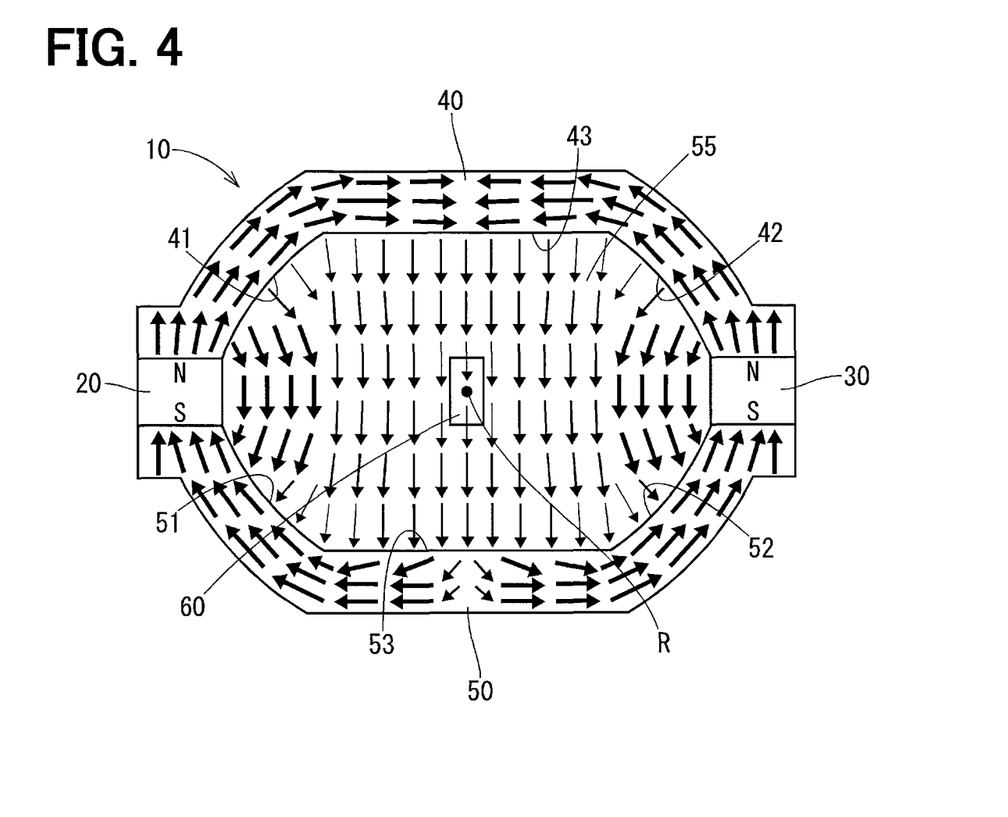
FIG. 4 is a schematic view showing by arrows directions of magnetic flux passing through each yoke in the sectional view of FIG. 2.

As shown by arrows in FIG. 4, the magnetic flux generated from the N-poles of the first magnet 20 and the second magnet 30 flow to the S-poles of the first magnet 20 and the second 30 through the first yoke 40, the inside space 55 between the first yoke 40 and the second yoke 50 and the second yoke 50. Some of the magnetic flux generated from the N-poles of the magnets 20 and 30 leak to the inside space 55 in the course of flowing from an end of the first yoke 40 to the central part.

The magnetic flux, which leaks from the first concave curved surface 41 and the second concave curved surface 42 of the first yoke 40 to the inside space 55 and flows to the third concave curved surface 51 and the fourth concave curved surface 52 of the second yoke 50 in a path along a direction parallel to the second direction D2 without curving toward the rotation axis center R side. The magnetic flux, which leaks from the first flat surface 43 of the first yoke 40 to the inside space 55 and flows to the second flat surface 53 of the second yoke 50 in a path parallel to the second direction D2 without curving. In FIG. 4, the direction of magnetic flux outside the first yoke 40 and the second yoke 50 is not shown. Further, in FIG. 4, the direction indicates a direction and the width indicates a magnitude of the magnetic flux density. That is, the magnetic flux density increases as the arrow becomes wider.

An operation of the rotation angle detection device 10 will be described next with reference to FIG. 4 to FIG. 9.

(1) Reference Position

When the first yoke 40 and the second yoke 50 are at the reference position as shown in FIG. 4, the magnetic flux passing through and near the Hall element 61 flows in the path parallel to the magnetism sensing surface of the Hall element 61. For this reason, assuming that the rotation angle of the rotary shaft 3 at the reference position is 0°, the magnetic flux density detected by the Hall element 61 is 0 mT as shown in FIG. 9 when the rotation angle of the rotary shaft 3 is 0°.

(2) Rotation Position

Figure 5:
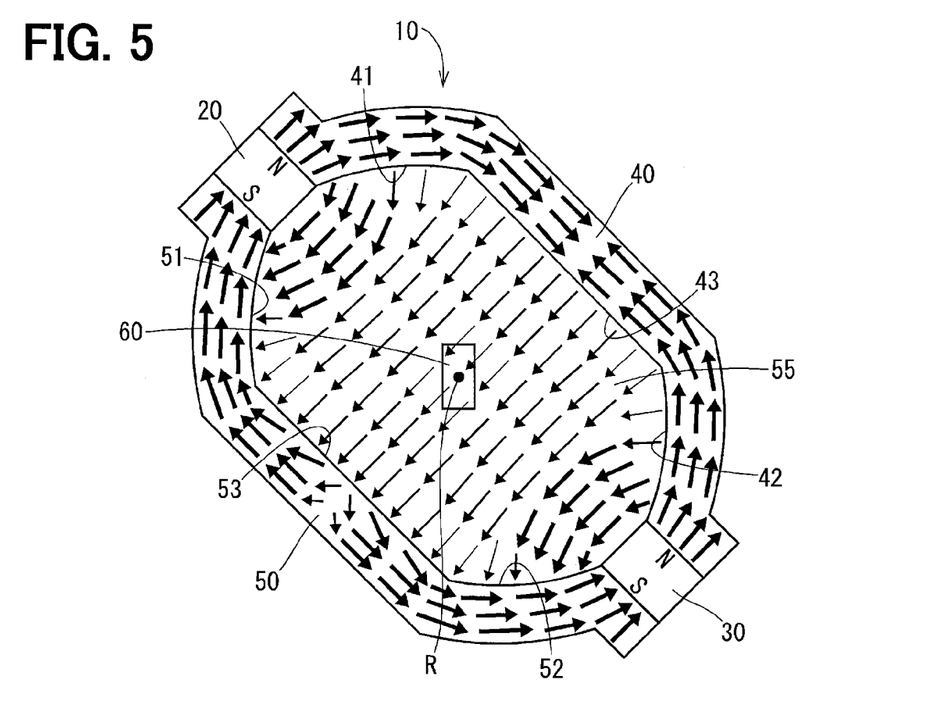
FIG. 5 is a schematic view showing a state, in which each yoke is rotated 45° in the clockwise direction from a reference position shown in FIG. 4.
Figure 6:
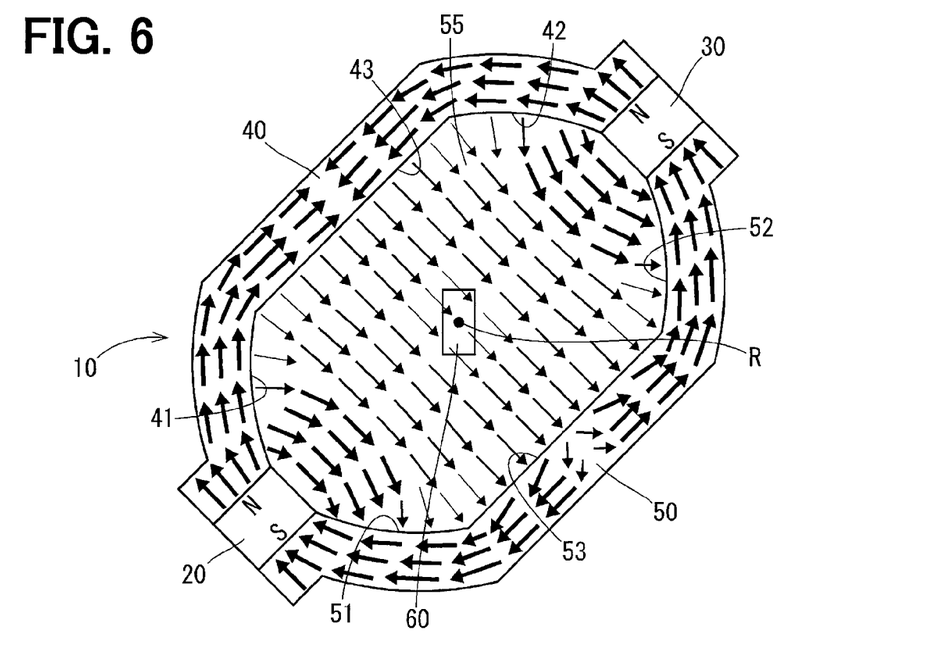
FIG. 6 is a schematic view showing a state, in which each yoke is rotated 90° in the clockwise direction from the reference position shown in FIG. 4.
Figure 7:
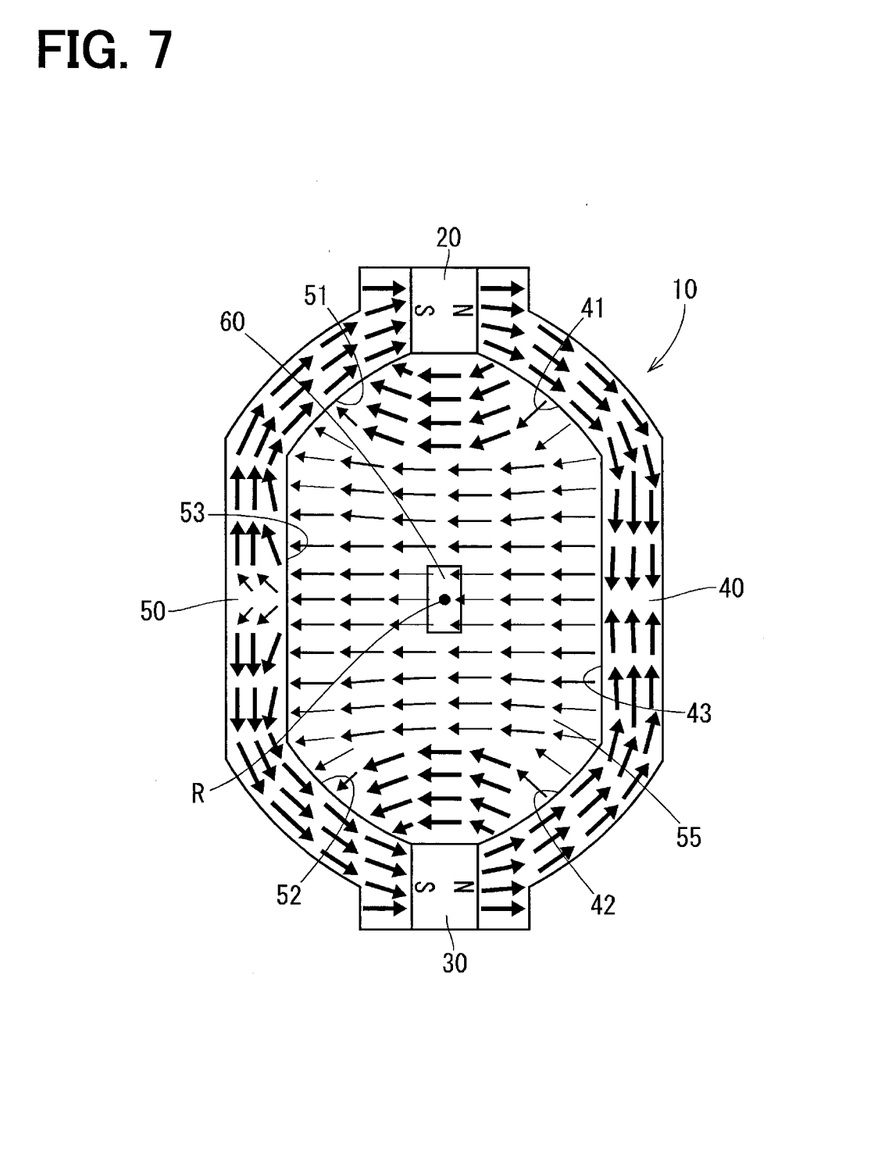
FIG. 7 is a schematic view showing a state, in which each yoke is rotated 45° in the counter-clockwise direction from the reference position shown in FIG. 4.
Figure 8:
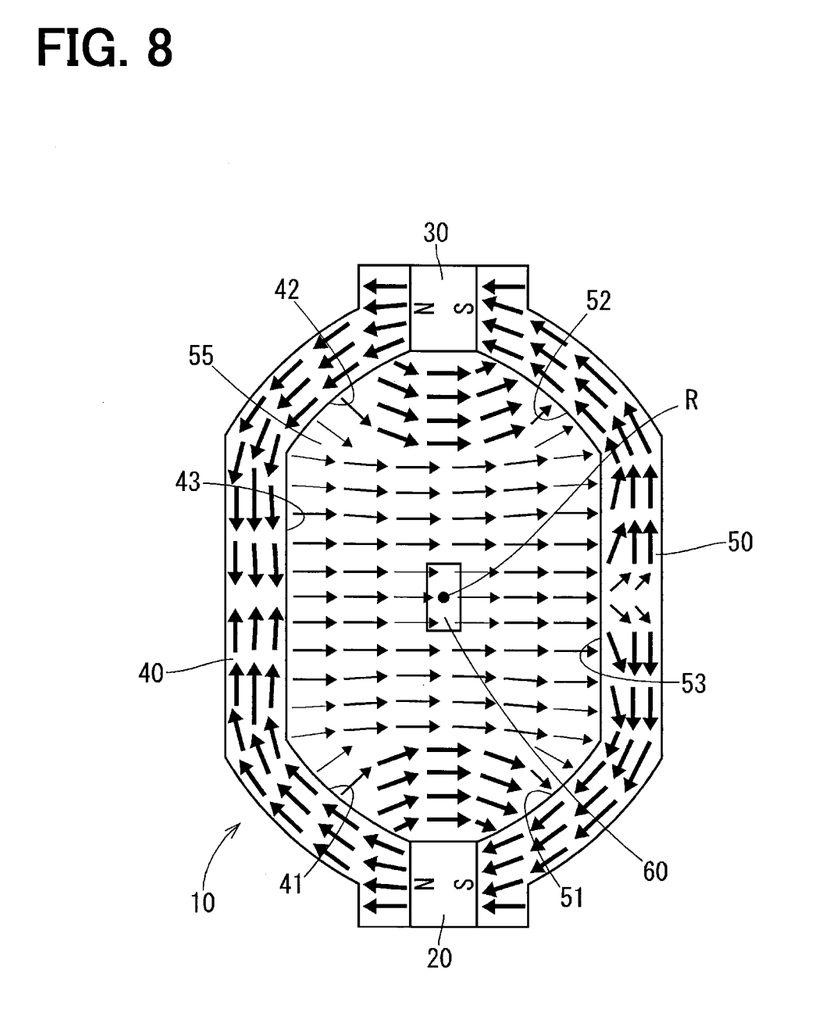
FIG. 8 is a schematic view showing a state, in which each yoke is rotated 90° in the counter-clockwise direction from the reference position shown in FIG. 4.

When the first yoke 40 and the second yoke 50 rotates from the reference position as the rotary shaft 3 rotates, the magnetic flux passing through and near the Hall element 61 flows in the path transverse to the magnetism sensing surface of the Hall element 61. For example, the magnetic flux flows as shown in FIG. 5 when the rotation angle of the rotary shaft 3 is 45°. The magnetic flux flows as shown in FIG. 6 when the rotation angle of the rotary shaft 3 is −45°. The magnetic flux flows orthogonally to the magnetism sensing surface of the Hall element 61 as shown in FIG. 7 and FIG. 8 when the rotation angle of the rotary shaft 3 is 90° and −90°, respectively.

Figure 9:
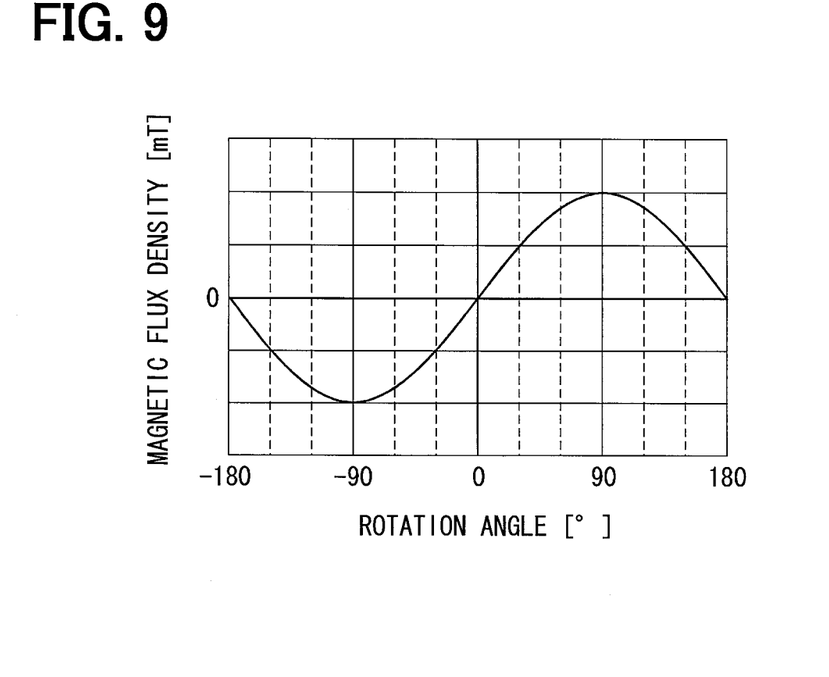
FIG. 9 is a characteristic graph of a magnetic density detected by a Hall element shown in FIG. 3.

As shown in FIG. 9, the magnetic flux density detected by the Hall element 61 continuously increases in the positive side as the rotation angle of the rotary shaft 3 changes from 0° toward 90°. The magnetic flux detected by the Hall element 61 reaches a maximum value in the positive side when the rotation angle is 90°. The magnetic flux density detected by the Hall element 61 continuously decreases to 0 mT as the rotation angle of the rotary shaft 3 changes from 90° toward 180°.

On the other hand, the magnetic flux density detected by the Hall element 61 continuously increases in the negative side as the rotation angle of the rotary shaft 3 changes from 0° toward −90°. The magnetic flux detected by the Hall element 61 reaches a maximum value in the negative side when the rotation angle is −90°. The magnetic flux density detected by the Hall element 61 continuously decreases to 0 mT as the rotation angle of the rotary shaft 3 changes from −90° toward −180°.

Figure 10:
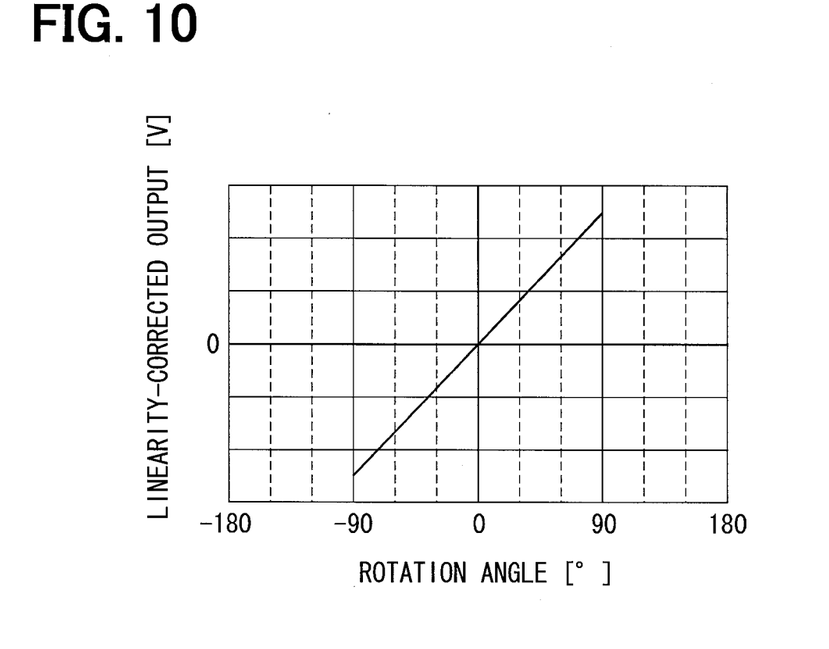
FIG. 10 is a characteristic graph of an electric signal outputted by the Hall IC shown in FIG. 3.

As described above in (1) and (2), the Hall element 61 outputs the analog electric signal in accordance with the strength or density of the magnetic field varying with rotation of the rotary shaft 3. The Hall IC 60 converts the analog electric signal outputted from the Hall element 61 into the digital electric signal, performs various signal processing including the linearity correction and then outputs the processed signal after conversion to the analog electric signal. FIG. 10 is a characteristic graph showing a linearity-corrected output of the Hall IC 60, which is linear or proportional to the rotation angle of the rotary shaft 3.

As described above, the rotation angle detection device 10 according to the first embodiment has the first yoke 40 including its inside surface, which faces the second yoke 50 and has the first concave curved surface 41 and the second concave curved surface 42. The device 10 also has the second yoke 50 including its inside surface, which faces the first yoke 40 and has the third concave curved surface 51 and the fourth concave curved surface 52. Each of the concave curved surfaces 41, 42, 51 and 52 extends in an inclined manner toward the first flat surface 43 or the second flat surface 53 without extending in parallel with the second direction D2. That is, the concave curved surfaces 41, 42, 51, 52 extend in different directions from the second direction D2 and non-parallel to the second direction D2.

Therefore, the magnetic flux leaking from the first concave curved surface 41 and the second concave curved surface 42 and flowing to the third concave curved surface 51 and the fourth concave curved surface 52 takes a path along a direction parallel to the second direction D2 without being curved. That is, in comparison to a case, in which an end part of each yoke extends from a magnet in parallel with the second direction D2, the magnetic flux leaking from the end part of the first yoke 40 into the inside space 55 and reaching the end part of the second yoke 50 is suppressed from being curved. Thus, in comparison to the comparative exemplary case, the magnetic flux becomes parallel to the second direction D2 over a wide range near the Hall element 61. As a result, even if the Hall element 61 is deviated in position relative to the first yoke 40 and the second yoke 50, that is, even if the position of the rotary shaft 3 relative to the housing 2 is deviated, the detection accuracy can be maintained with less degradation.

In addition, the inside surface of the first yoke 40 has the first flat surface 43 and the second flat surface 53. The first flat surface 43 extends in parallel with the first direction D1 to connect the first concave curved surface 41 and the second concave curved surface 42. The second flat surface 53 also extends in parallel with the first direction D1, that is, in parallel with the first flat surface 43, to connect the third concave curved surface 51 and the fourth concave curved surface 52. The first flat surface 43 and the second flat surface 53 face each other and parallel with each other sandwiching the Hall element 61 therebetween. For this reason, the magnetic flux leaking from the first flat surface 43 of the first yoke 40 to the inside space 55 and reaching the second flat surface 53 of the second yoke 50 flows in a path along the second direction D2 without curving. Therefore, the magnetic flux flows in parallel in the second direction D2 over a wider range of the Hall element 61 and its periphery. As a result, degradation of the detection accuracy, which may be caused by the positional deviation of the Hall element 61, can be suppressed more.

In addition, the center C1 of the radius of curvature of the first concave curved surface 41 and the second concave curved surface 42 is positioned at the second yoke 50 side relative to the rotation axis center R. Further, the center C2 of the radius of curvature of the third concave curved surface 51 and the fourth concave curved surface 52 is positioned at the first yoke 40 side relative to the rotation axis center R, that is, in the second direction D2. For this reason, the end part of the first yoke 40 or the second yoke 50, which has comparatively large magnetic flux density, is separated from the Hall element 61 and hence the magnetic flux density at the Hall element 61 and around its peripheral area can be equalized. Thus the detection accuracy can be improved.

In addition, the distance X1 between the first magnet 20 and the rotation shaft center R is equal to the distance X2 between the second magnet 30 and the rotation axis center R. Further, the tubular body formed of the first yoke 40, the second yoke 50, the first magnet 20 and the second magnet 30 is formed in plane symmetry relative to the imaginary surface S as the border, which passes through the rotation axis center R in the second direction D2. Thus the magnetic flux becomes parallel in the second direction D2 over a wider range of the Hall element 61 and its periphery.

Second Embodiment

Figure 11:
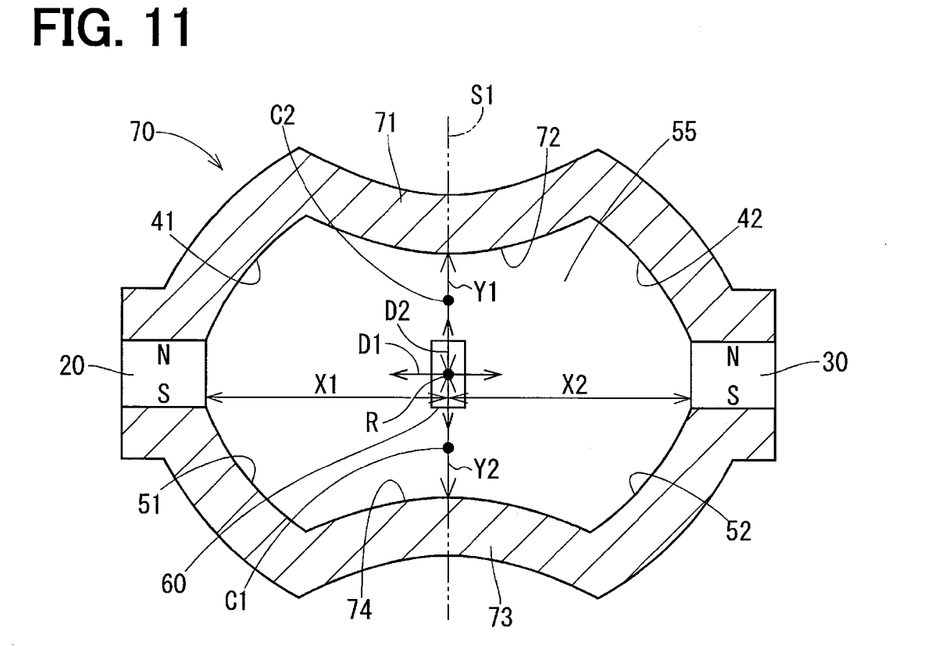
FIG. 11 is a schematic sectional view of a rotation angle detection device according to a second embodiment.
Figure 12:
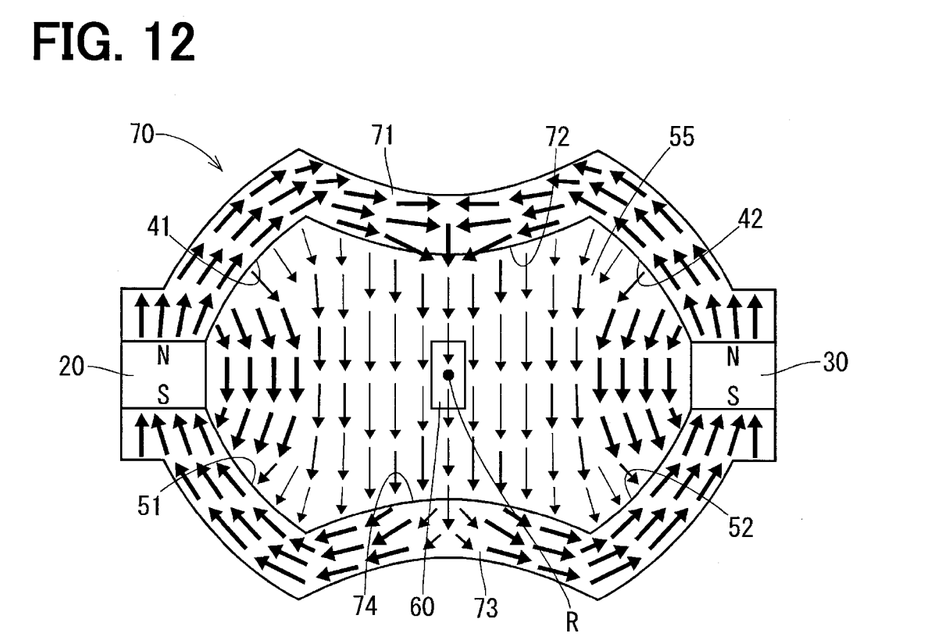
FIG. 12 is a schematic view showing by arrows directions of magnetic flux passing through each yoke in the sectional view of FIG. 11.

A rotation angle detection device 70 according to a second embodiment will be described with reference to FIG. 11 and FIG. 12 with respect to differences from the rotation angle detection device 10 in the first embodiment. In the rotation angle detection device 70, an inside surface of a first yoke 71 facing a second yoke 73 is formed of a first convex curved surface 72, which is in place of the first flat surface 43 in the first embodiment, in addition to the first concave curved surface 41 and the second concave curved surface 42. The first convex curved surface 72 connects the first concave curved surface 41 and the second concave curved surface 42 and protrudes toward the rotation axis center R. The outside surface of the first yoke 71 is shaped similarly to the inside surface. The inside surface of the second yoke 73, which faces the first yoke 71, is formed of a second convex curved surface 74, which is in place of the second flat surface 53 in the first embodiment, in addition to the third concave curved surface 51 and the fourth concave curved surface 52. The second convex curved surface 74 connects the third concave curved surface 51 and the fourth concave curved surface 52 and protrudes toward the rotation axis center R. The two convex curved surfaces 72 and 74 face each other with shorter distance therebetween in the second direction than in the first embodiment. The distance between the convex curved surfaces 72 and 74 is shortest in the second direction D2 at the rotation axis center R. The outside surface of the second yoke 73 is shaped similarly to the inside surface.

The second embodiment provides the similar advantage as the first embodiment. In addition, according to the second embodiment, the distance in the second direction D2 between the first convex curved surface 72 and the second convex curved surface 74 facing each other sandwiching the Hall element 61 therebetween becomes shorter as it is farther from the magnets 20 and 30. For this reason, a difference between the magnetic flux is reduced over a wide range of the Hall element 61 and its periphery. The detection accuracy can thus be suppressed from being lowered.

Other Embodiment

The rotation detection device described above may be modified as follows as other embodiments.

The concave curved surface and the convex curved surface of the first yoke and the second yoke may have different radiuses of curvature. The outside surfaces of the first yoke and the second yoke may be shaped differently from the inside surfaces.

The center of the radius of curvature of the concave curved surface of the first yoke may be coincident with the rotation axis center. The distance between the first magnet and the rotation axis center may be different from that between the second magnet and the rotation axis center. The shapes of the first yoke and the second yoke need not be in the plane symmetry with respect to the imaginary surface, which passes the rotation axis center in the second direction D2.

The magnetism detection device need not be the Hall element but may be a device such as a magneto-resistive element. In a case that the Hall element is used as the magnetism detection device, the Hall IC including various processing circuits may not be provided. That is, the rotation angle detection device may include only the Hall element and various processing may be attained externally.

The rotation angle detection device may be used in other apparatuses in a vehicle or in other systems different from a vehicle.

What is claimed is:

1. A rotation angle detection device for detecting a rotation angle of a rotary body, which rotates about a rotation axis center thereof, relative to a support body, the rotation angle detection device comprising:

a first magnet spaced apart from the rotation axis center of the rotary body and magnetized in a direction tangential to an imaginary circle, which is coaxial with the rotation axis center;

a second magnet positioned oppositely to the first magnet relative to the rotation axis center and magnetized in a same direction as the first magnet;

a first yoke fixed to the rotary body and connecting a N-pole of the first magnet and a N-pole of the second magnet;

a second yoke fixed to the rotary body to oppose the first yoke relative to the rotation axis center, the second yoke connecting a S-pole of the first magnet and a S-pole of the second magnet;

a magnetism detection element positioned on the rotation axis center and fixed to the support body, the magnetism detection element outputting an electric signal varying with a change in a magnetic field generated by relative rotation between the rotary body and the support body, wherein the first magnet and the second magnet are positioned to face each other in a first direction through the rotation axis center, and the first yoke and the second yoke are positioned to face each other in a second direction, which is orthogonal to the first direction, wherein the first yoke has an inside surface, which faces the second yoke and has a first concave curved surface, a second concave curved surface and a first connecting surface, the first concave curved surface extending from the N-pole of the first magnet in a direction different from the second direction such that the first concave curved surface is more spaced apart from the second yoke as more approaching from the first magnet toward the second magnet, the second concave curved surface extending from the N-pole of the second magnet in a direction different from the second direction such that the second concave curved surface is more spaced apart from the second yoke as more approaching from the second magnet toward the first magnet, and the first connecting surface connecting the first concave curved surface and the second concave curved surface and having a flat surface extending in the first direction or a convex curved surface protruding toward the rotation axis center, and wherein the second yoke has an inside surface, which faces the first yoke and has a third concave curved surface, a fourth concave curved surface and a second connecting surface, the third concave curved surface extending from the S-pole of the first magnet in a direction different from the second direction such that the third concave curved surface is more spaced apart from the first yoke as more approaching from the first magnet toward the second magnet, the fourth concave curved surface extending from the S-pole of the second magnet in a direction different from the second direction such that the fourth concave curved surface is more spaced apart from the first yoke as more approaching from the second magnet toward the first magnet, and the second connecting surface connecting the third concave curved surface and the fourth concave curved surface and having a flat surface extending in the first direction or a convex curved surface protruding toward the rotation axis center, wherein the first concave surface and the second concave surface have a center of a radius of curvature at a second yoke side relative to the rotation axis center; and the third concave surface and the fourth concave surface have a center of a radius of curvature at a first yoke side relative to the rotation axis center, the first magnet and the second magnet are spaced apart oppositely in the first direction from the rotation axis center by same distances, the first yoke and the second yoke are shaped to be in a plane symmetry relative to an imaginary plane, which passes the rotation axis center and extends in the second direction, and the center of a radius of curvature of the first concave curved surface and the second concave curved surface is between the second yoke and the rotation axis center, and the center of a radius of curvature of the third concave curved surface and the fourth concave curved surface is between the first yoke and the rotation axis center, wherein the first yoke and the second yoke are shaped to be in a plane symmetry relative to an imaginary plane, which passes the rotation axis center and extends in the first direction.

2. The rotation angle detection device according to claim 1, wherein:
the first connecting surface and the second connecting surface are the convex curved surfaces protruding toward the rotation axis.

3. The rotation angle detection device according to claim 1, further comprising:
a linearity correction section for correcting an electric signal outputted from the magnetism detection element to vary linearly in correspondence to a rotation angle of the rotary body.

4. The rotation angle detection device according to claim 1, wherein:
the magnetism detection element is a Hall element.

5. The rotation angle detection device according to claim 1, wherein:
the first yoke and the second yoke are spaced apart oppositely in the second direction from the rotation axis center by same distances.

6. The rotation angle detection device according to claim 1, wherein:
the first magnet and the second magnet are spaced apart oppositely in the first direction from the rotation axis center by same distances; and
the first yoke and the second yoke are spaced apart oppositely in the second direction from the rotation axis center by same distances, which are shorter than the distances of the first magnet and the second magnet spaced apart from the rotation axis center in the first direction.

7. The rotation angle detection device according to claim 1, wherein:
the center the radius of curvature of the first concave curved surface is coincident with the center the radius of curvature of the second concave curved surface, and
the center of the radius of curvature of the third concave curved surface is coincident with the center of the radius of curvature of the fourth concave curved surface.

* * * * *